(12) United States Patent
Nilsen et al.

(10) Patent No.: US 10,993,426 B2
(45) Date of Patent: May 4, 2021

(54) TWINSTARDRAG FISHING REEL

(71) Applicant: Accurate Grinding and Mfg. Corp., Corona, CA (US)

(72) Inventors: David Nilsen, Coto de Caza, CA (US); Douglas Nilsen, Laguna Hills, CA (US)

(73) Assignee: ACCURATE GRINDING AND MFG. CORP. DBA ACCURATE FISHING PRODUCTS, Corona, CA (US)

( * ) Notice: Subject to any disclaimer, the term of this patent is extended or adjusted under 35 U.S.C. 154(b) by 145 days.

(21) Appl. No.: 16/460,529

(22) Filed: Jul. 2, 2019

(65) Prior Publication Data

US 2020/0008412 A1 Jan. 9, 2020

Related U.S. Application Data

(60) Provisional application No. 62/694,899, filed on Jul. 6, 2018.

(51) Int. Cl.
*A01K 89/01* (2006.01)
*A01K 89/027* (2006.01)

(52) U.S. Cl.
CPC .................................. *A01K 89/027* (2013.01)

(58) Field of Classification Search
None
See application file for complete search history.

(56) References Cited

U.S. PATENT DOCUMENTS

| 2,076,097 | A | * | 4/1937 | Schafer | A01K 89/015 242/260 |
|---|---|---|---|---|---|
| 4,278,217 | A | * | 7/1981 | Blackwell | A01K 89/033 242/268 |
| 5,285,985 | A | * | 2/1994 | Sakaguchi | A01K 89/015 242/302 |
| 2008/0173745 | A1 | * | 7/2008 | Takechi | A01K 89/01903 242/321 |
| 2016/0088825 | A1 | * | 3/2016 | Ikebukuro | A01K 89/015 242/260 |
| 2016/0345559 | A1 | * | 12/2016 | Ikuta | A01K 89/0187 |
| 2017/0245484 | A1 | * | 8/2017 | Takechi | F16D 41/066 |

FOREIGN PATENT DOCUMENTS

| DE | 924842 | C | * | 3/1955 | ........... A01K 89/015 |
|---|---|---|---|---|---|
| JP | 60012925 | A | * | 1/1985 | ....... A01K 89/01903 |

* cited by examiner

*Primary Examiner* — Emmanuel M Marcelo (57) ABSTRACT

A fishing reel includes a drag gear coupled to a spool gear, and a drag engagement lever configured to be actuated between a first position to engage the drag gear with the spool gear and a second position to disengage the drag gear from the spool gear. The fishing reel further includes a first plurality of friction washers located on a first side of the drag gear and a second plurality of friction washers located on a second side of the drag gear and that match the first plurality of friction washers. The fishing reel further includes a first pressure pad and a second pressure pad, a star gear lever configured to rotate about a second axis, and a nut such that rotation of the star gear lever actuates the nut at least one of towards or away from the first pressure pad to increase or decrease drag.

19 Claims, 7 Drawing Sheets

TWINSTARDRAG FISHING REEL

CROSS-REFERENCE TO RELATED APPLICATIONS

This application claims the benefit and priority of U.S. Provisional Application No. 62/694,899, entitled "TWINSTARDRAG FISHING REEL," filed on Jul. 6, 2018, the entire disclosure of which is hereby incorporated by reference herein in its entirety.

BACKGROUND

1. Field

The present disclosure relates to fishing reels having a star drag mechanism with matching drag washers on both sides of a drag gear.

2. Description of the Related Art

Fishermen prefer different types of fishing reels for various situations. Star drag reels provide reduced friction while in free spool relative to lever drag reels. This reduced friction allows for greater casting distance and better swimming baits while the reel is in free spool. However, star drag reels fail to provide a "smooth" feel while force is applied to the fishing line and the reel is in gear (i.e., a drag gear is engaged with a spool gear) because star drag reels typically have drag washers on one side of the main gear but not the other. This mismatch of the drag washers undesirably results in a "jerky" feel as a fish is pulling on a terminal end of the fishing line.

Thus, there is a need in the art for fishing reels that have a star drag mechanism and also provide a smooth drag sensation as a fish or other load is applying force to the line.

SUMMARY

Described herein is a fishing reel. The fishing reel includes a spool having a spool shaft and designed to receive fishing line and to rotate about a first axis. The fishing reel further includes a spool gear designed to be coupled to the spool shaft and to rotate with the spool shaft. The fishing reel further includes a drag gear designed to be coupled to the spool gear. The fishing reel further includes a plurality of friction washers including a first plurality of friction washers located on a first side of the drag gear and a second plurality of friction washers located on a second side of the drag gear. The fishing reel further includes a star gear lever configured to rotate about a second axis to compress or decompress the plurality of friction washers about the drag gear to increase or decrease, respectively, drag applied to the spool.

Also described is a fishing reel. The fishing reel includes a spool having a spool shaft and designed to receive fishing line and to rotate about a first axis. The fishing reel further includes a spool gear designed to be coupled to the spool shaft and to rotate with the spool shaft. The fishing reel further includes a drag gear designed to be coupled to the spool gear. The fishing reel further includes a drag engagement lever designed to be actuated between a first position in which it engages the drag gear with the spool gear and a second position in which it disengages the drag gear from the spool gear. The fishing reel further includes a plurality of friction washers including a first plurality of friction washers located on a first side of the drag gear and a second plurality of friction washers located on a second side of the drag gear, a quantity of the first plurality of friction washers being equal to a quantity of the second plurality of friction washers, and a dimension of each of the first plurality of friction washers being equal to a dimension of each of the second plurality of friction washers. The fishing reel further includes a first pressure pad located at a first end of the plurality of friction washers and a second pressure pad located at a second end of the plurality of friction washers. The fishing reel further includes a star gear lever designed to rotate about a second axis. The fishing reel further includes a nut rotatably coupled to the star gear lever and in contact with the first pressure pad such that rotation of the star gear lever actuates the nut at least one of towards or away from the first pressure pad to at least one of increase or decrease a distance between the first pressure pad and the second pressure pad in order to adjust drag pressure applied to the drag gear by the plurality of friction washers.

Also described is a fishing reel. The fishing reel includes a spool having a spool shaft and designed to receive fishing line and to rotate about a first axis. The fishing reel further includes a spool gear designed to be coupled to the spool shaft and to rotate with the spool shaft. The fishing reel further includes a drag gear designed to be coupled to the spool gear. The fishing reel further includes a plurality of friction washers including a first plurality of friction washers located on a first side of the drag gear and a second plurality of friction washers located on a second side of the drag gear, a quantity and a dimension of the first plurality of friction washers being equal to a quantity and a dimension of the second plurality of friction washers. The fishing reel further includes a star gear lever designed to rotate about a second axis to compress or decompress the plurality of friction washers about the drag gear to increase or decrease, respectively, drag applied to the spool.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes star drag fishing reels that apply relatively even pressure (and friction) on both sides of a main gear. The application of relatively even pressure on both sides of the main gear, as described by the present disclosure, advantageously allows for increased drag to be applied to the spool, and also improves the feel of the drag (i.e., provides a "smooth" drag) while pressure is applied to the line. The relatively even pressure further beneficially reduces wear and tear on the drag system, thus increasing the life of the reel. This is the result of friction being evenly distributed to the drag washers on both sides of the main gear.

Referring generally to FIGS. 1-5, a fishing reel 100 is shown. The fishing reel 100 may be referred to as a Twin-StarDrag fishing reel as it has a star drag control mechanism and matching drag washers on both sides of a drag gear to provide even drag pressure to both sides of the drag gear.

In particular, the fishing reel 100 includes a spool 102 having a spool shaft 122. The spool 102 (and spool shaft 122) are designed to rotate about a first axis A-A'. Fishing line (not shown) may be wound around the spool 102, as is known in the art. The fishing line may have a terminal end distal from the fishing reel 100 that may be tied to a hook or terminal tackle with the aim of hooking a fish by the hook or terminal tackle. The fishing reel 100 is designed to apply pressure to a fish while simultaneously allowing line to come off the spool 102 when the pressure applied by the fish is greater than a maximum pressure threshold (the pressure threshold being adjustable by adjusting a star drag engagement lever 124, as described below). The maximum pressure threshold may be referred to as an amount of "drag." It may be desirable for fishing line to come off of the spool 102 in this situation to prevent damage or breaking of the fishing line.

Figure 1:
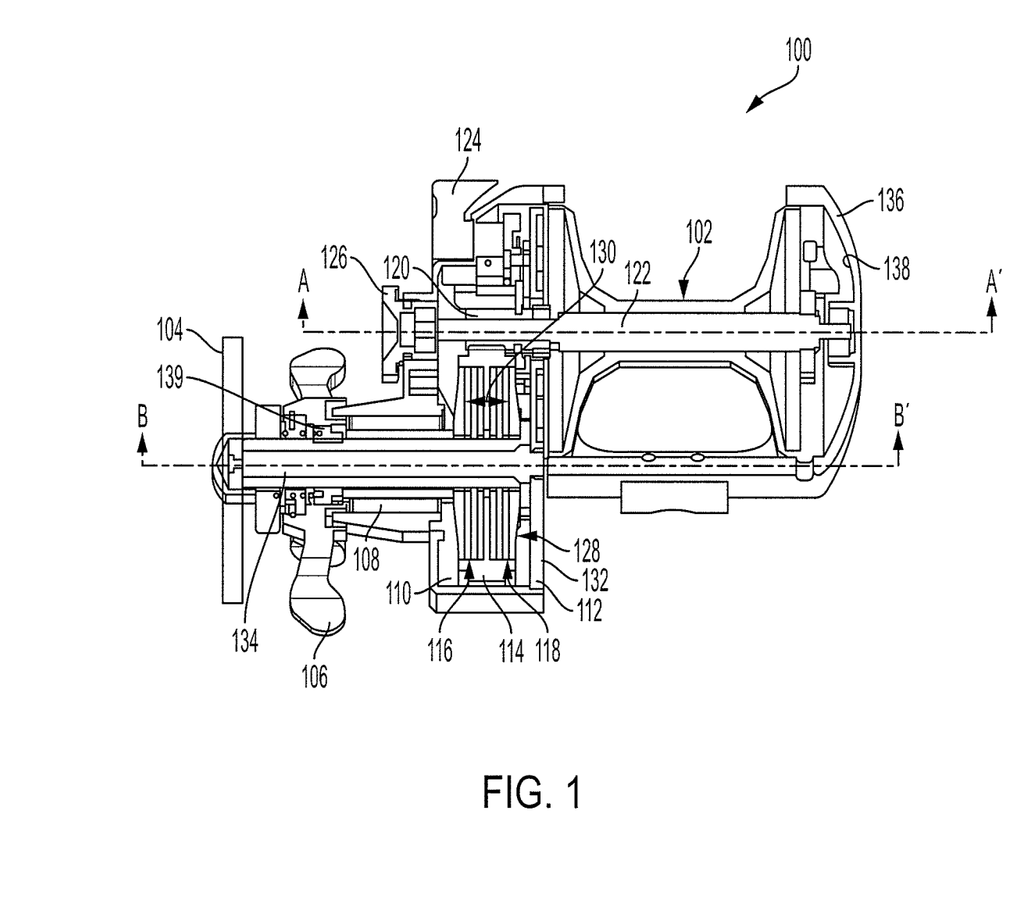
FIG. 1 is a cross-sectional view of a fishing reel having matching friction washers on either side of a drag gear according to an embodiment of the present disclosure.

The fishing reel 100 may further include a main housing 136. The main housing 136 may house a portion of the spool 102 as well as other elements of the fishing reel 100, as shown in FIG. 1. The main housing 136 may include a relatively-high tensile strength material such as aerospace-grade aluminum, stainless steel, a carbon-fiber material, or the like. In various embodiments, the main housing 136 may have a convex shape (represented by a curvature 138) at its outer edges that is designed to reduce an amount of material used in the fishing reel 100 while retaining structural integrity in potentially compromising situations. This reduction in weight is desirable as the trend in sportfishing has been towards lighter tackle.

The fishing reel 100 further includes a handle 104. The handle 104 may be coupled to the spool shaft 122 (via a main shaft 134 and gearing, as described more fully below) and may be used to rotate the spool shaft 122 about the first axis A-A' in order to wind line onto the spool 102. The handle 104 may rotate about a second axis B-B' which may be the same as, or different than, the first axis A-A'.

The fishing reel 100 may further include a star gear lever 106. The star gear lever 106 may include a plurality of fingers (for example, between 2 and 12) and may resemble a star or asterisk. The star gear lever 106 may be rotated about an axis, such as the second axis B-B' or another axis. The star gear lever 106 may be used to adjust an amount of drag applied to the spool shaft 122 when the drag is engaged.

The fishing reel 100 may further include a nut 139 in contact with, or otherwise coupled to, the star gear lever 106. Rotation of the star gear lever 106 actuates the nut 139 along the axis B-B'. For example, the nut 139 may be threaded onto a threaded shaft, and rotation of the star gear lever 106 (and thus the nut 139) may actuate the nut 139, which pushes sleeve 108 along the axis B-B'. The direction of actuation along the axis B-B' may be based on the direction of rotation of the star gear lever 106 (i.e., either clockwise or counter-clockwise).

Figure 2:
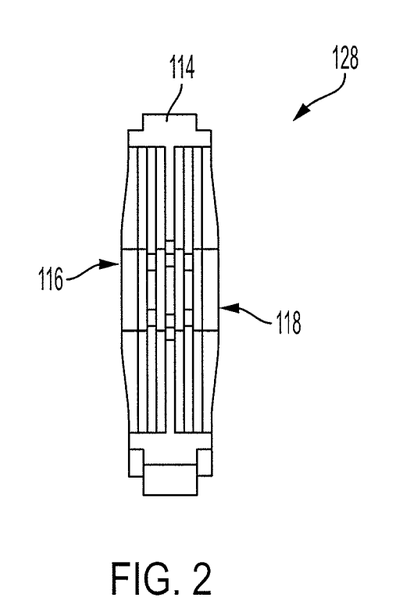
FIG. 2 is a cross-sectional view of a drag mechanism of the fishing reel of FIG. 1 according to an embodiment of the present disclosure.
Figure 3:
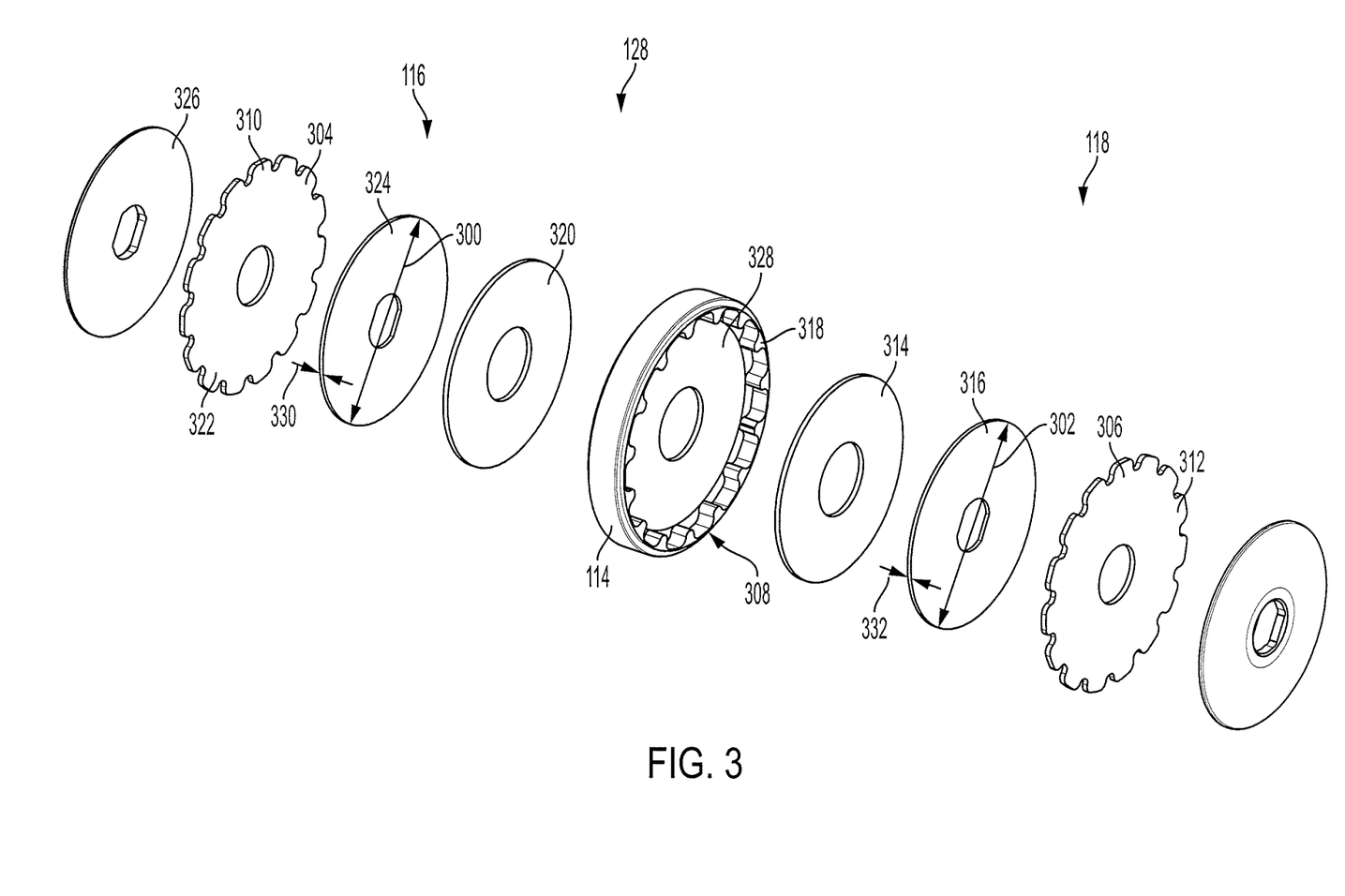
FIG. 3 is an exploded view of the drag mechanism of FIG. 2 according to an embodiment of the present disclosure.
Figure 4:
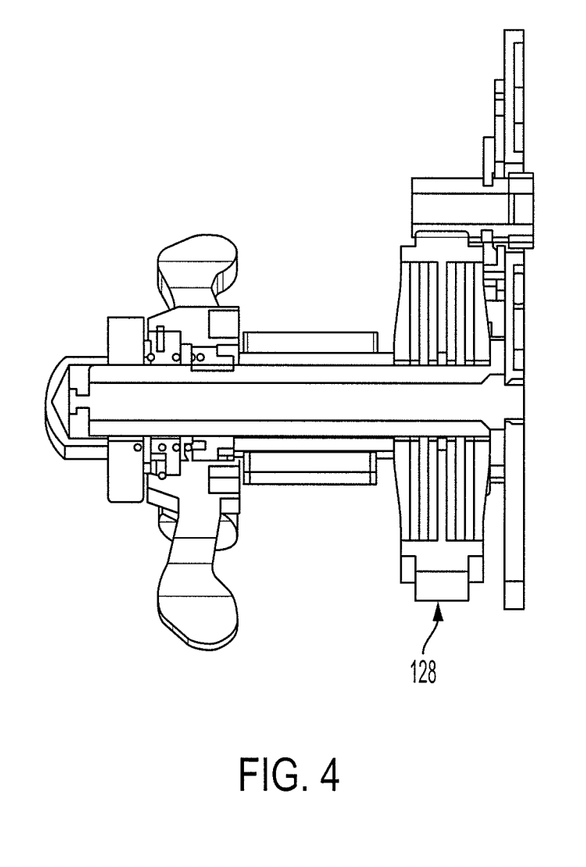
FIG. 4 is a cross-sectional view of a portion of the fishing reel of FIG. 1 according to an embodiment of the present disclosure.
Figure 5:
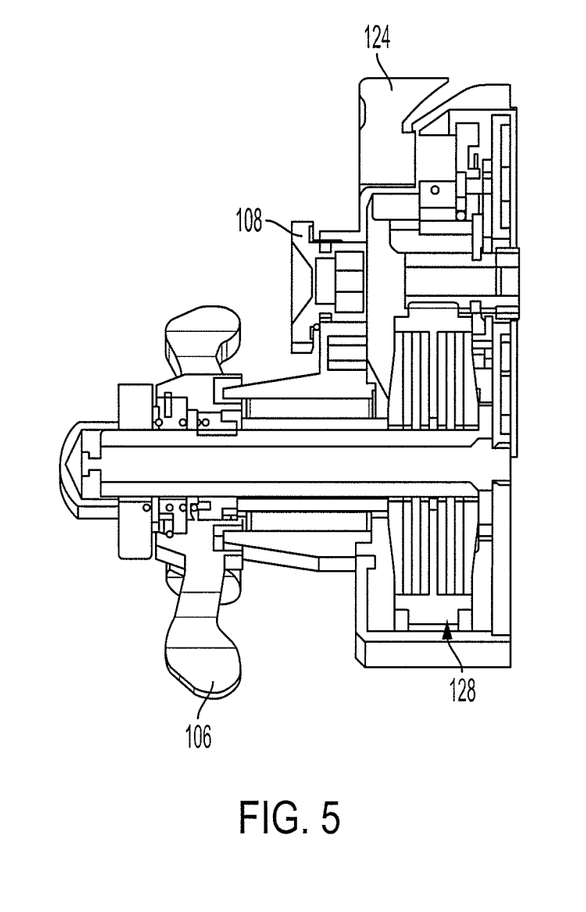
FIG. 5 is a cross-sectional view of a portion of the fishing reel of FIG. 1 according to an embodiment of the present disclosure.

The fishing reel 100 may further include a drag mechanism 128 which includes a drag housing 132, a first pressure pad 110, a second pressure pad 112, a drag gear 114, a first plurality of friction washers 116, and a second plurality of friction washers 118. The first pressure pad 110, the second pressure pad 112, the drag gear 114, the first plurality of friction washers 116, and the second plurality of friction washers 118 may be housed within the drag housing 132. The drag housing 132 may be formed integral (e.g., monolithic) with or separately from the main housing 136. In embodiments in which the drag housing 132 is separate from the main housing 136, the drag housing 132 may be coupled to the main housing 136 via fasteners or other coupling means.

The first plurality of friction washers 116 is located on a first end of the drag gear 114 along the axis B-B', and the second plurality of friction washers 118 is located on a second end of the drag gear 114 along the axis B-B'. The friction washers 116, 118 and the drag gear 114 are sandwiched between the first pressure pad 110 and the second pressure pad 112. The second pressure pad 112 may be retained in place by the drag housing 132. The pressure pads 110, 112 may be capable of frictionally engaging with the friction washers 116 or may provide compression without frictional engagement. The pressure pads 110, 112 may be separate components or may be integral (monolithic) with the drag housing 132.

The fishing reel 100 may further include a spool gear 120 coupled to the spool shaft 122 and configured to rotate along with the spool shaft 122. The fishing reel 100 may further include a drag engagement lever 124. The drag engagement lever 124 may be actuated between a first position which causes the spool gear 120 engage with the drag gear 114, and a second position which causes the spool gear 120 to disengage from the drag gear 114. For example, the spool gear 120 and the drag gear 114 may each include teeth, or cogs, designed to interface with each other. When the drag engagement lever 124 is actuated to the first position, it may cause the teeth of the spool gear 120 to engage with the teeth of the drag gear 114, thus rotatably coupling the spool gear 120 to the drag gear 114.

When the spool gear 120 is engaged with the drag gear 114, the drag gear 114 is rotatably coupled to the spool gear such that the two rotate together at the same radial velocity. This results in drag (i.e., pressure) being applied to the spool 102 via the drag gear 114 (i.e., pressure is applied to the drag gear 114 which is then transferred to the spool 102 via the spool gear 120). Pressure is applied to the drag gear 114 by compression of the friction washers 116, 118 and the drag gear 114 between the pressure pads 110, 112.

The amount of pressure applied to the drag gear 114 (i.e., the amount of drag) can be adjusted by rotating the star gear lever 106. As the star gear lever 106 is rotated in a first direction, the nut 139 is actuated towards the first pressure pad 110 (the second pressure pad 112 remains in place such that the nut 139 forces the first pressure pad 110 towards the second pressure pad 112). For example, the nut 139 may be threaded about a threaded shaft and may rotate with the star gear lever 106, such rotation causing the threading of the nut 139 to engage with the threading of the threaded shaft and to actuate towards the second pressure pad 112 (or the threaded shaft may be caused to rotate, thus causing the nut to actuate towards the second pressure pad 112).

This actuation increases pressure applied to the drag gear 114 by the friction washers 116, 118 by forcing the friction washers 116, 118 towards the drag gear 114 (i.e., by decreasing a distance 130 between the first pressure pad 110 and the second pressure pad 112). Stated differently, the friction washers 116, 118 and the drag gear 114 are further compressed between the pressure pads 110, 112, thus increasing friction between the friction washers 116, 118 and the drag gear 114. This increased friction increases the drag applied to the line by the fishing reel 100.

As the star gear lever 106 is rotated in a second direction (opposite from the first direction), the nut 139 is actuated away from the first pressure pad 110. This actuation reduces pressure applied to the drag gear 114 by the friction washers 116, 118 by allowing the friction washers 116, 118 to at least partially separate from the drag gear 114 (i.e., by increasing the distance 130 between the first pressure pad 110 and the second pressure pad 112, or by reducing the compression of the friction washers 116, 118 and drag gear 114 between the pressure pads 110, 112).

The handle 104 may be coupled or fixed to the main shaft 134, and the drag gear 114 may likewise be coupled or fixed to the main shaft 134. In that regard, the handle 104 may rotate with the main shaft 134, and the drag gear 114 may rotate with the main shaft. In some embodiments, the fishing reel 100 may be designed such that the handle 104 may rotate the main shaft 134 when rotated in a first direction but fails to rotate the main shaft 134 when rotated in a second direction.

When the spool gear 120 is engaged with the drag gear 114, rotation of the handle 104 in turn rotates the main shaft 134. This rotation transfers through the drag gear 114 and the spool gear 120, thus rotating the spool shaft 122 and winding line onto the spool 102. In response to the pressure applied to the line being greater than allowed by the drag mechanism 128 (i.e., the drag gear 114 "slips" between the friction washers 116, 118), the torque applied to the handle 104 likewise slips and line fails to be wound onto the spool 102 until the pressure applied to the line is less than or equal to that allowed by the drag mechanism 128. When the spool gear 120 is disengaged from the drag gear 114, rotation of the handle 104 may rotate the main shaft 134, but such rotation fails to transfer from the drag gear 114 to the spool gear 120, and thus rotation of the handle 104 fails to transfer to the spool shaft 122.

The fishing reel 100 may further include a tension adjustment mechanism 126. The tension adjustment mechanism 126 may include a knob, dial, lever, or the like. The tension adjustment mechanism 126 may be rotated (in such embodiments as when it includes a knob or dial) to adjust an amount of tension applied to the spool shaft 122 when the spool gear 120 is disengaged from the drag gear 114. Stated differently, rotation of the tension adjustment mechanism 126 may adjust an amount of tension applied to the spool 102 when the fishing reel 100 is in free spool. This adjustment may be desirable as some anglers are more skilled at preventing a line tangle during casting of a reel and may wish to reduce the tension applied to the spool shaft 122, while other anglers of less skill would desire increased tension applied to the spool shaft 122.

Referring specifically to FIG. 3, the drag mechanism 128 is shown in an exploded view. As shown, a quantity of the first plurality of friction washers 116 may be equal to a quantity of the second plurality of friction washers 118. For example, the quantity of the first plurality of friction washers 116 and the quantity of the second plurality of friction washers 118 may both be 2, 3, 4, 5, 6, or the like. Likewise, a dimension (such as a diameter 300 and/or a thickness 330) of the first plurality of friction washers 116 may be equal to a dimension (such as a diameter 302 and/or a thickness 332) of the second plurality of friction washers 118. In that regard, the first plurality of friction washers 116 may be a mirror image of the second plurality of friction washers 118.

Such matching of the friction washers 116, 118 advantageously allows for, or provides, substantially equal pressure (or friction) to be applied to the drag gear 114 by the first plurality of friction washers 116 and by the second plurality of friction washers 118. Where used in this context, "substantially" refers to the referenced value plus or minus 20 percent (20%) of the referenced value. In that regard, the amount of pressure applied to the drag gear 114 by the first plurality of friction washers 116 may be within 20% of the amount of pressure applied to the drag gear 114 by the second plurality of friction washers 118. This matching of the friction washers 116, 118 results in a smooth feel when the drag is engaged (i.e., such as when a fish is hooked on a terminal end of the fishing line) and reduced wear on the friction washers 116, 118 (i.e., wear will be evenly distributed to friction washers 116, 118 on both sides of the drag gear 114 rather than concentrated on a single side).

The drag gear 114 may include a drag gear housing 308 coupled to the drag gear 114. The drag gear housing 308 may define at least one notch 318 on either side of the drag gear 114. In some embodiments, as shown in FIG. 3, the drag gear housing 308 defines a plurality of evenly circumferentially distributed notches 318 on either side of the drag gear 114. The first plurality of friction washers 116 may include a first protrusion washer (or "first stabilizing washer") 304, and the second plurality of friction washers 118 may include a second protrusion washer (or "second stabilizing washer") 306. Each of the protrusion washers 304, 306 may include at least one protrusion 310, 312 jutting outward therefrom. The protrusions 310, 312 may be received by the drag gear housing 308 to reduce the likelihood of rotation of the protrusion washers 304, 306 relative to the drag gear 114.

In some embodiments, the friction washers 116, 118 may include alternating smooth washers 316 and friction washers 314. For example, the friction washers 116 may include one or more smooth washers 324, 326 interspersed with one or more friction disks 320, 322. The friction disks 320, 322 may include a carbon fiber or other material designed to provide a friction surface on either side, and the smooth washers 324, 326 may include a metal, such as stainless steel or aluminum, which may have smooth surfaces, friction-inducing surfaces, or both. The drag gear 114 may have a friction surface 328 on both sides (i.e., the side that faces the friction washers 116 and the side that faces the friction washers 118), and the friction surfaces 328 may interface with the friction washers 116, 118 to generate friction therebetween. In that regard, the carbon washer 320 may contact the friction surface 328 of the drag gear 114.

Figure 6:
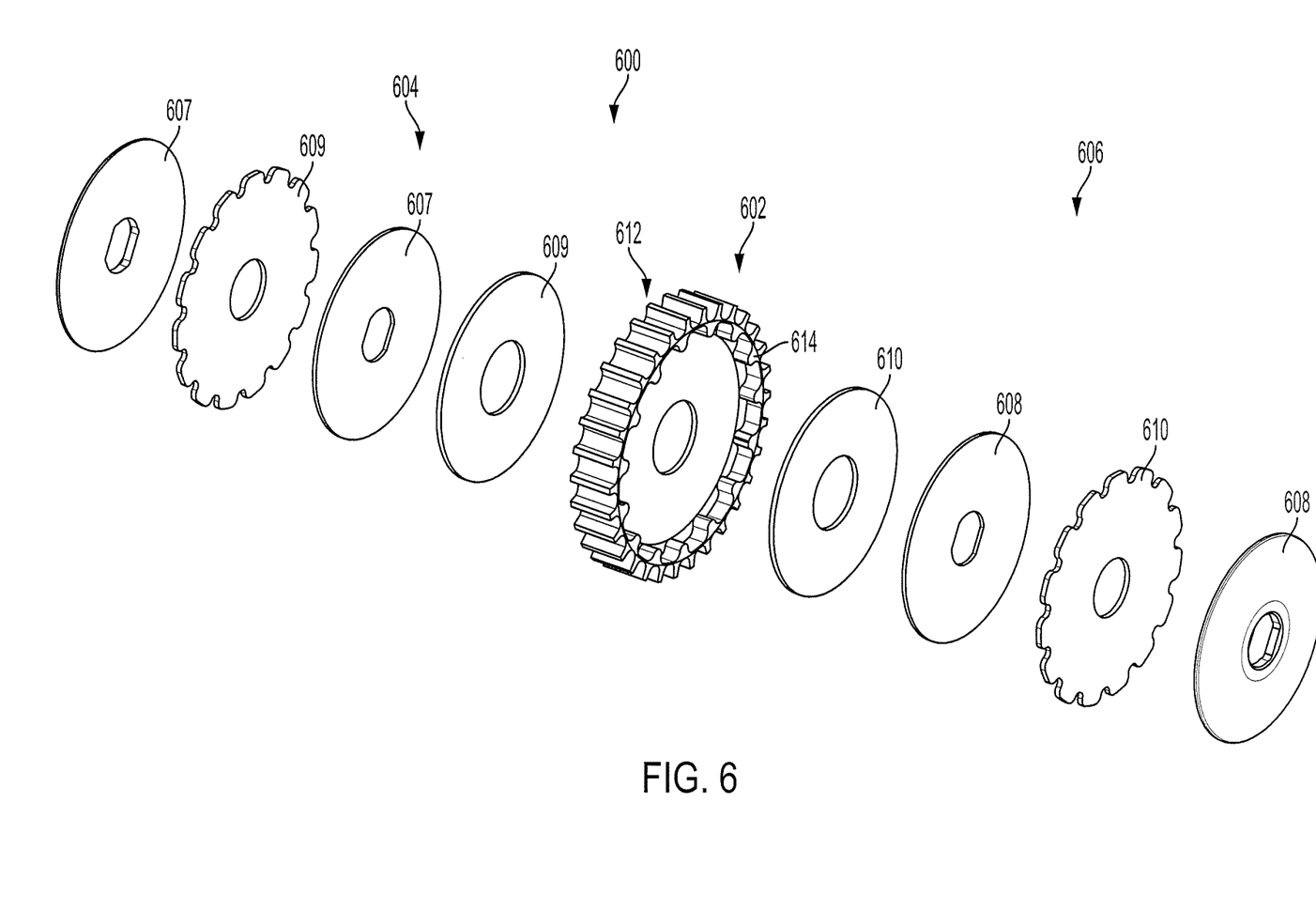
FIG. 6 illustrates a drag mechanism for use with a fishing reel that includes matching friction washers on either side of a drag gear according to an embodiment of the present disclosure.

Turning now to FIG. 6, another drag mechanism 600 is shown. The drag mechanism 600 includes a drag gear 602, a first plurality of friction washers 604, and a second plurality of friction washers 606. The first plurality of friction washers 604 includes friction discs 607 and smooth washers 609. The second plurality of friction washers 606 includes friction discs 608 and smooth washers 610. The friction discs 607, 608 may apply friction to the drag gear 602 and to the smooth washers 609, 610. As shown in FIG. 6, the drag gear 602 includes teeth or cogs 612. The teeth or cogs 612 may be formed in a drag gear housing 614 and may mesh together with teeth or cogs of a corresponding spool gear in order to rotatably couple the drag gear 602 to the spool gear.

Figure 7:
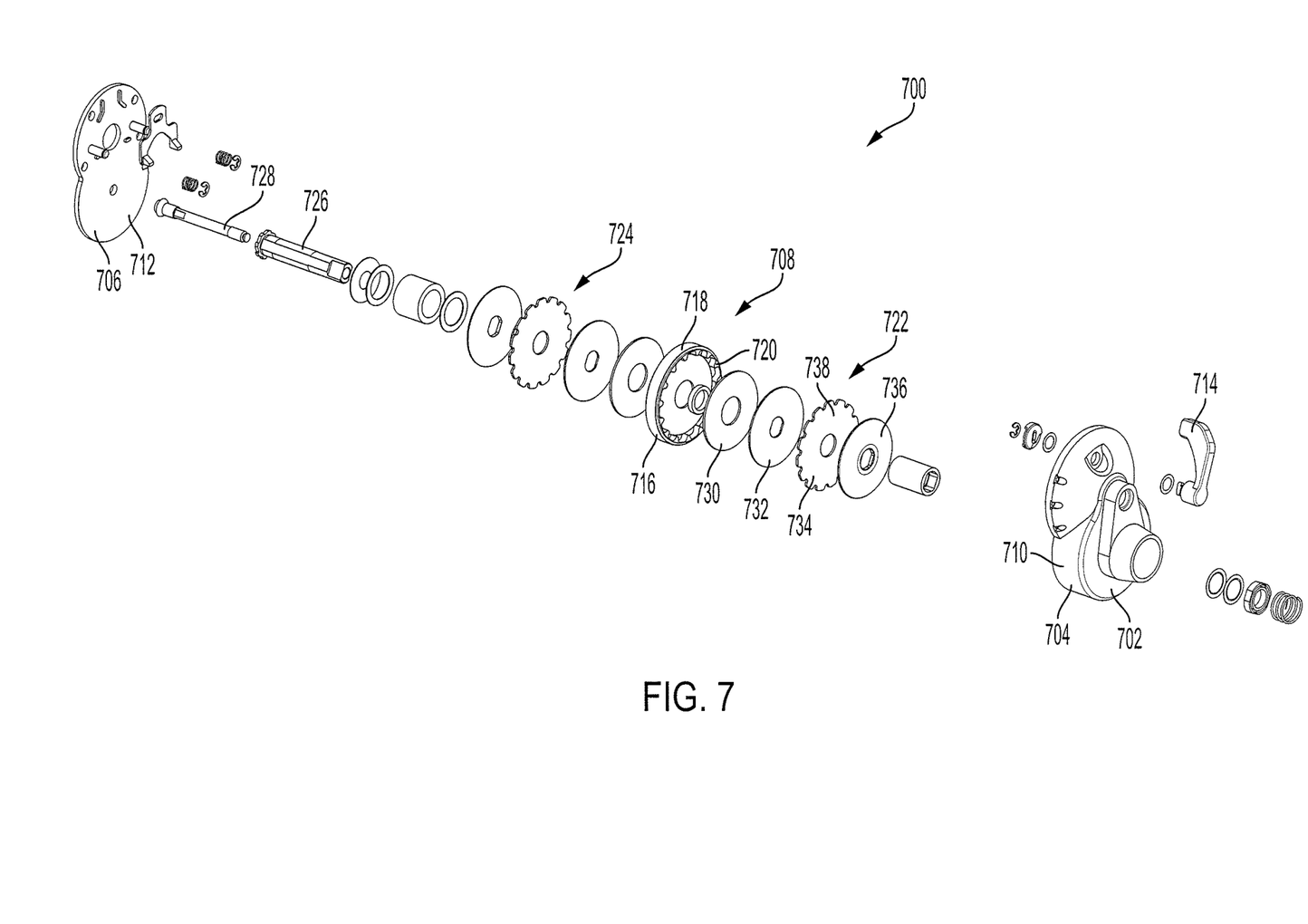
FIG. 7 is an exploded view of a portion of a fishing reel having matching friction washers on either side of a drag gear according to an embodiment of the present disclosure.

Referring to FIG. 7, a portion of a fishing reel 700 may include similar features as the fishing reel 100 of FIG. 1. In particular, the fishing reel 700 may include a drag housing 702 having a first portion 704 that is designed to be removably coupled to a second portion 706. Being able to de-couple the first portion 704 from the second portion 706 facilitates repair or replacement of components housed within the drag housing 702.

The fishing reel 700 may further include a drag mechanism 708 which includes a side plate 710 and a bridge plate 712. In some embodiments, the side plate 710 and the bridge plate 712 may be formed integral with the drag housing 702. In various embodiments, the side plate 710 and the bridge plate 712 may be formed with the same material as the drag housing 702 or may include additional material (such as a carbon-fiber material) coupled to the drag housing 702.

The fishing reel 700 may further include a drag engagement lever 714 that functions in a similar manner as the drag engagement lever 124 of FIG. 1.

The fishing reel 700 (and drag mechanism 708) may further include a drag gear 716 including a drag gear housing 718. The drag gear housing 718 may define a plurality of notches 720 on an inner surface thereof.

The fishing reel 700 (and drag mechanism 708) may also include a first plurality of friction washers 722 and a second plurality of friction washers 724. The first plurality of friction washers 722 and the second plurality of friction washers 724 may have similar characteristics. In that regard, each of the first plurality of friction washers 722 may identically match each of the second plurality of friction washers 724. Stated differently, the second plurality of friction washers 724 may be a mirror image of the first plurality of friction washers 722 on an opposite side of the drag gear 716. Additionally, a quantity of the first plurality of friction washers 722 may be equal to a quantity of the second plurality of friction washers 724. Also, one or more dimension (such as a diameter, thickness, or the like) of the each of the first plurality of friction washers 722 may match that of each of the second plurality of friction washers 724.

The fishing reel 700 may further include a main shaft 726 that extends along an axis. Each of the drag gear 716, the first plurality of friction washers 722, and the second plurality of friction washers 724 may be centered and positioned around the main shaft 726. The fishing reel 700 may further include a handle pin 728 designed to be coupled to a handle and to couple the handle to the main shaft 726.

In response to rotation of a star gear lever (not shown) in a first direction, the plurality of friction discs 722, 724 and the drag gear 716 may become compressed together. In response to rotation of the star gear lever in a second direction, the plurality of friction discs 722, 724 and the drag gear 716 may decompress. Friction among the friction discs 722, 724 and the drag gear 716 may apply drag to fishing line (not shown) wound around a spool (not shown).

The first plurality of friction washers 722 may include four friction washers. In some embodiments, the first plurality of friction washers 722 may include one or more drag washers interspersed with one or more friction discs. In particular, the first plurality of friction washers 722 may include a first friction disk 730, a first drag washer 732, a second friction disk 734, and a second drag washer 736. The friction discs 730, 734 may include a material designed to generate friction (such as by inclusion of a rough surface or a material, such as carbon fiber, that includes friction inducing properties). The drag washers 732, 736 may include a material designed to generate less friction than the friction discs 730, 734, such as a metal (e.g., stainless steel) with smooth or semi-rough surfaces. In that regard, the drag washers 732, 736 may generate less friction than the friction disks 730, 734.

The friction disk 734 may include teeth or cogs 738 designed to be received by the notches 720 of the drag gear housing 718. This engagement between the teeth or cogs 738 and the notches 720 resists rotation of the friction disk 734 relative to the drag gear 716.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A fishing reel comprising:
   a spool having a spool shaft and configured to receive fishing line and to rotate about a first axis;
   a spool gear configured to be coupled to the spool shaft and to rotate with the spool shaft;
   a drag gear configured to be coupled to the spool gear;
   a plurality of friction washers including a first plurality of friction washers located on a first side of the drag gear and a second plurality of friction washers located on a second side of the drag gear, a quantity of the first plurality of friction washers being equal to a quantity of the second plurality of friction washers; and
   a star gear lever configured to rotate about a second axis to compress or decompress the plurality of friction washers about the drag gear to increase or decrease, respectively, drag applied to the spool.

2. The fishing reel of claim 1 further comprising:
   a first pressure pad located at a first end of the plurality of friction washers and a second pressure pad located at a second end of the plurality of friction washers; and
   a nut rotatably coupled to the star gear lever and in contact with the first pressure pad such that rotation of the star gear lever actuates the nut at least one of towards or away from the first pressure pad to increase or decrease, respectively, the drag applied to the spool.

3. The fishing reel of claim 1 wherein an amount of friction applied to the drag gear by the first plurality of friction washers is substantially equal to an amount of friction applied to the drag gear by the second plurality of friction washers.

4. The fishing reel of claim 1 wherein the quantity of the first plurality of friction washers is between one and five.

5. The fishing reel of claim 1 wherein the first plurality of friction washers includes alternating smooth washers and friction disks.

6. The fishing reel of claim 1 further comprising a drag gear housing coupled to the drag gear and defining at least one notch, wherein the plurality of friction washers includes a first protrusion washer and a second protrusion washer that each include at least one protrusion jutting outward from the first protrusion washer and the second protrusion washer and configured to be received by the at least one notch of the drag gear housing.

7. The fishing reel of claim 1 further comprising a drag engagement lever configured to be actuated between a first position in which it engages the drag gear with the spool gear and a second position in which it disengages the drag gear from the spool gear.

8. The fishing reel of claim 1 further comprising a tension adjustment mechanism configured to adjust an amount of tension applied to the spool when the drag gear is disengaged from the spool gear such that the spool gear is in free spool.

9. The fishing reel of claim 1 further comprising a handle coupled to the drag gear and configured to rotate the spool via the drag gear and the spool gear when the drag gear is engaged with the spool gear.

10. A fishing reel comprising:
a spool having a spool shaft and configured to receive fishing line and to rotate about a first axis;
a spool gear configured to be coupled to the spool shaft and to rotate with the spool shaft;
a drag gear configured to be coupled to the spool gear;
a drag engagement lever configured to be actuated between a first position in which it engages the drag gear with the spool gear and a second position in which it disengages the drag gear from the spool gear;
a plurality of friction washers including a first plurality of friction washers located on a first side of the drag gear and a second plurality of friction washers located on a second side of the drag gear, a quantity of the first plurality of friction washers being equal to a quantity of the second plurality of friction washers, and a dimension of each of the first plurality of friction washers being equal to a dimension of each of the second plurality of friction washers;
a first pressure pad located at a first end of the plurality of friction washers and a second pressure pad located at a second end of the plurality of friction washers;
a star gear lever configured to rotate about a second axis; and
a nut rotatably coupled to the star gear lever and in contact with the first pressure pad such that rotation of the star gear lever actuates the nut at least one of towards or away from the first pressure pad to at least one of increase or decrease a distance between the first pressure pad and the second pressure pad in order to adjust drag pressure applied to the drag gear by the plurality of friction washers.

11. The fishing reel of claim 10 wherein an amount of friction applied to the drag gear by the first plurality of friction washers is substantially equal to an amount of friction applied to the drag gear by the second plurality of friction washers.

12. The fishing reel of claim 10 wherein the quantity of the first plurality of friction washers is between one and five.

13. The fishing reel of claim 10 wherein the first plurality of friction washers includes alternating smooth washers and friction disks.

14. The fishing reel of claim 10 further comprising a drag gear housing coupled to the drag gear and defining at least one notch, wherein the plurality of friction washers includes a first protrusion washer and a second protrusion washer that each include at least one protrusion jutting outward from the first protrusion washer and the second protrusion washer and configured to be received by the at least one notch of the drag gear housing.

15. The fishing reel of claim 10 further comprising a tension adjustment mechanism configured to adjust an amount of tension applied to the spool when the drag gear is disengaged from the spool gear such that the spool gear is in free spool.

16. The fishing reel of claim 10 further comprising a handle coupled to the drag gear and configured to rotate the spool via the drag gear and the spool gear when the drag gear is engaged with the spool gear.

17. A fishing reel comprising:
a spool having a spool shaft and configured to receive fishing line and to rotate about a first axis;
a spool gear configured to be coupled to the spool shaft and to rotate with the spool shaft;
a drag gear configured to be coupled to the spool gear;
a plurality of friction washers including a first plurality of friction washers located on a first side of the drag gear and a second plurality of friction washers located on a second side of the drag gear, a quantity and a dimension of the first plurality of friction washers being equal to a quantity and a dimension of the second plurality of friction washers; and
a star gear lever configured to rotate about a second axis to compress or decompress the plurality of friction washers about the drag gear to increase or decrease, respectively, drag applied to the spool.

18. The fishing reel of claim 17 wherein an amount of pressure applied to the drag gear by the first plurality of friction washers is substantially equal to an amount of pressure applied to the drag gear by the second plurality of friction washers.

19. The fishing reel of claim 17 wherein the first plurality of friction washers includes alternating smooth washers and friction disks.

\* \* \* \* \*